(12) United States Patent
Haarsager et al.

(10) Patent No.: US 12,332,725 B2
(45) Date of Patent: Jun. 17, 2025

(54) METHOD AND SYSTEM FOR MONITORING THE HEALTH OF A SERVER AND FOR PROACTIVELY PROVIDING ALERTS AND GUIDANCE BASED ON A SERVER HEALTH SCORECARD

(71) Applicant: Humana Inc., Louisville, KY (US)

(72) Inventors: Sean D. Haarsager, Louisville, KY (US); Sreeni Julakanti, Louisville, KY (US)

(73) Assignee: Humana Inc., Louisville, KY (US)

( * ) Notice: Subject to any disclaimer, the term of this patent is extended or adjusted under 35 U.S.C. 154(b) by 101 days.

(21) Appl. No.: 18/123,086

(22) Filed: Mar. 17, 2023

(65) Prior Publication Data

US 2024/0311218 A1 Sep. 19, 2024

(51) Int. Cl.
*G06F 11/00* (2006.01)
*G06F 11/34* (2006.01)

(52) U.S. Cl.
CPC ........ *G06F 11/004* (2013.01); *G06F 11/3495* (2013.01)

(58) Field of Classification Search
CPC .................... G06F 11/004; G06F 11/3495
See application file for complete search history.

(56) References Cited

U.S. PATENT DOCUMENTS

| | | | | |
|---|---|---|---|---|
| 9,465,619 | B1* | 10/2016 | Rottenstreich | G06F 9/3836 |
| 11,991,059 | B1* | 5/2024 | Gambhir | H04L 43/065 |
| 2003/0204781 | A1* | 10/2003 | Peebles | G06F 11/0748 |
| | | | | 714/25 |
| 2013/0081063 | A1* | 3/2013 | Hosie | G06F 9/52 |
| | | | | 719/314 |
| 2019/0041457 | A1* | 2/2019 | Krishnan | G06F 11/302 |
| 2020/0358713 | A1* | 11/2020 | Jain | H04L 41/149 |
| 2022/0207003 | A1* | 6/2022 | Khan | G06F 16/2379 |
| 2023/0155911 | A1* | 5/2023 | Turi | H04L 41/5012 |
| | | | | 709/224 |
| 2023/0393919 | A1* | 12/2023 | Nigudkar | G06F 11/076 |
| 2024/0241978 | A1* | 7/2024 | Chopra | G06F 21/6218 |

\* cited by examiner

*Primary Examiner* — Philip Guyton
*Assistant Examiner* — Sean Kevin McNamara
(74) *Attorney, Agent, or Firm* — Standley Law Group LLP; Jeffrey S. Standley; James L. Kwak

(57) ABSTRACT

A method and system for monitoring the health of a server and for generating a server health risk score and graphical scorecard with recommendations regarding server resources. A health risk score is generated based on a threshold-based, weighted algorithm that measures the relative stress a computer server or server infrastructure is under and indicates how a server's performance will be negatively impacted. Another algorithm uses the weighted value of the server health risk score and determines how much of a particular resource type (e.g., CPU, RAM) is needed to bring down the health risk score.

11 Claims, 22 Drawing Sheets

SQL SERVER RISK SCORECARD LIFECYCLE

DISK SPACE USAGE

| HOST | DISK | CAPACITY MB | FREE SPACE MB | DISK STATUS | | |
|---|---|---|---|---|---|---|
| LOUSQLWPS484 | C | 65533 | 19220 | 0 · 16383 · 32767 | 49150 | 65533 |
| LOUSQLWPS484 | D | 30716 | 4999 | 0 · 7679 · 15358 | 23037 | 30716 |
| LOUSQLWPS484 | F | 102396 | 102286 | 0 · 25599 · 51198 | 76797 | 102396 |
| LOUSQLWPS484 | H | 409596 | 79765 | 0 · 102399 · 204798 | 307197 | 409596 |
| LOUSQLWPS484 | J | 2096124 | 885113 | 0 · 524031 · 1048062 | 1572093 | 2096124 |
| LOUSQLWPS484 | K | 2097150 | 300782 | 0 · 524288 · 1048575 | 1572863 | 2097150 |
| LOUSQLWPS484 | L | 1638396 | 587015 | 0 · 409599 · 819198 | 1228797 | 1638396 |
| LOUSQLWPS484 | M | 2097148 | 329363 | 0 · 524287 · 1048574 | 1572861 | 2097148 |
| LOUSQLWPS484 | N | 1572860 | 262915 | 0 · 393215 · 786430 | 1179645 | 1572860 |
| LOUSQLWPS484 | O | 2096124 | 281782 | 0 · 524031 · 1048062 | 1572093 | 2096124 |

FIG. 11

| YEAR - MONTH | DAYS TO FULL | GROWTH/DAY | GROWTH RATE % |
|---|---|---|---|
| 2017 - 11 | 21456 | (88.18) | -49662.2% |
| 2017 - 12 | 7326 | (26.12) | -45694.8% |
| 2018 - 1 | 8594 | (31.37) | -44766.9% |
| 2018 - 2 | 8172 | (36.66) | -45767.7% |
| 2018 - 3 | 8172 | (29.80) | -46257.7% |
| 2018 - 4 | 8453 | (32.99) | -47162.7% |
| 2018 - 5 | 8453 | (30.86) | -46680.0% |
| 2018 - 6 | 5213 | (258.59) | -46859.4% |

| THRESHOLD NAME | SCORE THRESHOLD | PIM THRESHOLD | OPERATOR | WEIGHTING |
|---|---|---|---|---|
| PROCESSOR INFORMATION\% PROCESSOR TIME | 60 | 90 | ABOVE | 21.5% |
| SQLserver:BUFFER MANAGER\PAGE LIFE EXPECTANCY | 1000 | | CALCULATED | 15.4% |
| PhysicalDisk\AVG. DISK SEC/READ | 0.05 | 0.5 | ABOVE | 13.6% |
| PhysicalDisk\AVG. DISK SEC/WRITE | 0.05 | 0.5 | ABOVE | 11.9% |
| SQLServer:GENERAL STATISTICS\PROCESSES BLOCKED | 1 | | ABOVE | 7.8% |
| SQLServer:BUFFER MANAGER\BUFFER CACHE HIT RATIO | 90 | | BELOW | 6.8% |
| MEMORY\AVAILABLE MBytes | 1000 | | BELOW | 5.2% |
| PAGING FILE\% USAGE | 40 | | ABOVE | 4.4% |
| SQLServer:SQL STATISTICS\SQL COMPILES & RECOMPILES/SEC | 1000 | | ABOVE | 4.0% |
| PROCESSOR QUEUE LENGTH\SYSTEM | 2 | | ABOVE | 3.7% |
| SQLServer:SQL STATISTICS\SQL COMPILES & RECOMPILES/SEC | 1000 | | ABOVE | 3.1% |
| SQLServer:ACCESS METHODS\FORWARDED RECORDS/SEC | 1000 | | ABOVE | 2.6% |
| | | | TOTAL: | 100% |

FIG. 17

STORAGE DETAIL

DATABASE SPACE USAGE

| DATABASE NAME | DATA SPACE (USED MB) | LOG SPACE (USED MB) |
|---|---|---|
| Humana_Perspectium | 343616.57 | 342.41 |

DISK SPACE USAGE

| HOST NAME | DISK | CAPACITY MB | FREE SPACE MB | DISK STATUS |
|---|---|---|---|---|
| LOUSQLWPS1109 | C | 66057 | 30175 | 0  16514  33029  49543  66057 |
| | D | 30717 | 16120 | 0  7679  15359  23038  30717 |
| | H | 255870 | 87118 | 0  63968  127935  191903  255870 |
| | J | 614270 | 550335 | 0  153568  307135  460703  614270 |
| | K | 1402750 | 929550 | 0  350688  701375  1052063  1402750 |
| | L | 358270 | 102960 | 0  89568  179135  268703  358270 |

FIG. 22

ACTION PLAN:

| RECOMMENDATION/ACTION | OWNER | ETA | COMPLETION STATUS | ROADBLOCKS |
|---|---|---|---|---|
| HARDWARE UPGRADE IS NEEDED TO ADD MORE RESOURCES | | | | |
| ADD MISSING INDEXES | | | | |
| TUNE EXPENSIVE QUERIES | | | | |

SERVER OVERALL OBSERVATIONS:

THE HEALTH RISK SCORE IS THE WEIGHTED AVERAGE OF THE TIME ABOVE THE THRESHOLD FOR ALL TARGETED RESOURCE MEASURES AND SUMMED BY DAY AND COMPARED AGAINST THE ENTIRE SQL SERVER POPULATION. THERE ARE TWO TYPES OF RISK SCORE VALUES: AVERAGE AND PEAK.

| HEALTH RISK SCORE | CURRENT SCORE | TARGET SCORE |
|---|---|---|
| AVERAGE SCORE (BETWEEN 2022-12-01 AND 2023-02-01) | 237 | <100 |
| PEAK SCORE (BETWEEN 2022-12-01 AND 2023-02-01) | 465 | <200 |

THERE ARE TWO WAYS TO IMPACT THIS SCORE; ADD RESOURCE AND REDUCE LOAD.
BASED ON THE CURRENT SCORES THE FOLLOWING RECOMMENDATIONS ARE BEING MADE:

SERVER RESOURCES:

ADJUSTING THE AVAILABLE RESOURCES ON THE SERVER CAN HAVE AN IMMEDIATE IMPACT WITH PERFORMANCE AND OPERATIONAL READINESS. THE FOLLOWING IS RECOMMENDED FOR THIS SERVER:

| SERVER RESOURCE | CURRENT | SUGGESTED |
|---|---|---|
| CPU | 16 | 20 |
| RAM | 192 | 240 |

LOAD ADJUSTMENTS:

MODIFYING THE LOAD THROUGH INDEX OPTIMIZATION AND CODE EFFECTIVENESS HAS A LONGER-TERM IMPACT ON THE SERVER RESOURCE LOAD, PERFORMANCE, AND OPERATIONAL READINESS. THIS CAN INVOLVE ADDITIONAL STEPS AND VALIDATION.

| STRUCTURAL CONCERNS | CURRENT | RECOMMENDED |
|---|---|---|
| ADD MISSING INDEXES | 189 | 38 |
| TUNE EXPENSIVE QUERIES | 635 | 90 |

FIG. 24

PROD POPULATION HEALTH RISK SCORE IMPACT & RECOMMENDATION

| SERVER NAME | HEALTH RISK SCORE (AVERAGE) | HEALTH RISK SCORE (PEAK) | CPU CORE COUNT | RAM | CPU TO ADD | RAM TO ADD | IDEAL CPU | IDEAL RAM |
|---|---|---|---|---|---|---|---|---|
| LOUSQLWPS4505 | 706 | 975 | 10.00 | 120 | 8 | 84 | 18 | 216 |
| LOUSQLWPS1301 | 448 | 826 | 2.00 | 24 | 2 | 12 | 4 | 48 |
| LOUSQLWPC215S01 | 400 | 645 | 24.00 | 464 | 10 | 192 | 56 | 672 |
| LOUSQLWPC215S02 | 400 | 645 | 24.00 | 464 | 10 | 192 | 56 | 672 |
| LOUSQLWPC143S01 | 370 | 491 | 12.00 | 164 | | 60 | 20 | 240 |
| LOUSQLWPC143S02 | 370 | 491 | 12.00 | 164 | | 60 | 20 | 240 |
| LOUSQLWPS1394 | 364 | 498 | 8.00 | 131 | 4 | 48 | 16 | 192 |
| LOUSQLWPS1026 | 358 | 427 | 12.00 | 144 | 4 | 48 | 18 | 216 |
| LOUSQLWPS4508 | 328 | 514 | 8.00 | 120 | 4 | 36 | 14 | 168 |
| LOUSQLWPS732 | 318 | 414 | 6.00 | 36 | | 12 | 4 | 48 |
| LOUSQLWPS1225 | 317 | 627 | 16.00 | 192 | 6 | 60 | 22 | 264 |
| LOUSQLWPS4022 | 314 | 375 | 24.00 | 106 | | 36 | 12 | 144 |
| LOUSQLWPS781 | 312 | 519 | 4.00 | 48 | 2 | | 6 | 72 |
| LOUSQLWPS986 | 311 | 468 | 32.00 | 3071 | | | | |
| LOUSQLWPC152S01 | 305 | 867 | 16.00 | 192 | 8 | 60 | 24 | 288 |
| LOUSQLWPC152S02 | 305 | 867 | 16.00 | 192 | 8 | 60 | 24 | 288 |
| LOUSQLWPS3020 | 304 | 678 | 2.00 | 24 | 2 | | 4 | 48 |
| LOUSQLWPS1277 | 299 | 505 | 24.00 | 288 | 6 | 84 | 32 | 384 |
| LOUSQLWPC120V01 | 296 | 459 | 144.00 | 3071 | | | | |
| LOUSQLWPS1307 | 295 | 733 | 8.00 | 128 | 2 | | 12 | 144 |
| LOUSQLWPC161S01 | 291 | 672 | 12.00 | 136 | 4 | 36 | 18 | 216 |
| LOUSQLWPC161S02 | 291 | 672 | 12.00 | 136 | 4 | 36 | 18 | 216 |
| LOUSQLWPC144S01 | 288 | 447 | 24.00 | 193 | 8 | | 32 | 384 |
| LOUSQLWPC144S02 | 288 | 447 | 24.00 | 193 | 8 | | 32 | 384 |
| LOUSQLWPS3048 | 283 | 352 | 4.00 | 48 | 2 | | 6 | 72 |
| LOUSQLWPS910 | 282 | 353 | 16.00 | 225 | | 60 | 24 | 288 |
| LOUSQLWPS697 | 282 | 613 | 4.00 | 24 | 2 | | 6 | 72 |
| LOUSQLWPS830 | 282 | 545 | 24.00 | 250 | | 72 | 28 | 336 |
| LOUSQLWPS169 | 282 | 968 | 4.00 | 48 | 2 | 12 | 6 | 72 |
| LOUSQLWPC197S01 | 279 | 540 | 6.00 | 100 | 2 | 24 | 12 | 144 |
| LOUSQLWPC197S02 | 279 | 540 | 6.00 | 100 | 2 | 24 | 12 | 144 |

FIG. 25

METHOD AND SYSTEM FOR MONITORING THE HEALTH OF A SERVER AND FOR PROACTIVELY PROVIDING ALERTS AND GUIDANCE BASED ON A SERVER HEALTH SCORECARD

BACKGROUND OF THE INVENTIVE FIELD

The present invention is directed to a method and system for providing an indication of how much stress a Structured Query Language (SQL) Server, and its underlying infrastructure, is under and what is causing the stress. The present invention guides development and support teams in acquiring resources (e.g., CPU, RAM, storage, etc.) before the server runs into performance problems that start to impact business operations. A server Health Risk Score (HRS) is generated that creates a picture of not only what the SQL Server needs, but also why it needs it and how to correct the issues before they become a problem.

As the population of SQL Servers within organizations and companies grow, there is a need to proactively monitor thousands of servers in a way that could evolve predictive properties. Real-time monitoring of all production servers is gathered and centralized into a specialized data repository covering multiple years. The data from this centralized repository is leveraged against multiple analytic models to produce a daily risk (health) score. Using this risk scorecard within a systems lifecycle can contribute to optimal server performance and efficient system operation.

SUMMARY OF THE GENERAL INVENTIVE CONCEPT

In one embodiment of the invention, the invention is a method for monitoring the health of a server or its infrastructure and for generating a server health risk score with recommendations regarding server resources, the method comprising the steps of: collecting a plurality of operating metrics of the server; associating a predetermined threshold level for each of the plurality of operating metrics; monitoring each of the plurality of operating metrics of the server to determine if any of the plurality of operating metrics of the server go past the predetermined threshold level associated with each of the plurality of operating metrics; tracking the duration of time that each of the plurality of operating metrics goes past the predetermined threshold level associated with each of the plurality of operating metrics over a predetermined time period; applying a weight to each of the plurality of operating metrics to obtain a server health risk score for the server; determining how much of a particular resource is needed to bring down the server health risk score for the server; and providing a report comprising the server health risk score and a recommendation to add a quantity of the particular resource to bring down the server health risk score for the server.

In one example embodiment, the method of the present invention is also comprised of the steps of: generating a graphical report; comprising an indication of the server health risk score for the server; a graphical depiction of an amount of CPU cores currently being used by the server and a recommended amount of CPUs to add to the server; a graphical depiction of an amount of RAM currently being used by the server and a recommended amount of RAM to add to the server; generating a list of all monitored servers ranked by server health risk score; and color coding the list of all monitored servers based on the health of each monitored server.

The foregoing and other features and advantages of the present invention will be apparent from the following more detailed description of the particular embodiments, as illustrated in the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 11 illustrates one example chart showing disk space usage;

FIG. 17 illustrates one embodiment of a threshold matrix of the present invention;

FIG. 22 illustrates one embodiment of a graph showing storage detail of the monitored servers;

FIG. 24 illustrates one embodiment of a graph showing action or recommendations plan generated by the present invention; and FIG. 25 illustrates one embodiment of a table or list showing the ordering of servers by health risk score.

DETAILED DESCRIPTION OF EXEMPLARY EMBODIMENT(S)

The following detailed description of the example embodiments refers to the accompanying figures that form a part thereof. The detailed description provides explanations by way of exemplary embodiments. It is to be understood that other embodiments may be used having changes that incorporate the scope of the present invention without departing from the spirit of the invention.

The life cycle 10 of one embodiment of the server health risk scorecard is comprised of the following steps:
1. Real-Time Server Monitoring 12—All production servers are monitored in real-time covering waits, resources and other health measures.
2. Data Repository 14—The monitoring process stores the measure in a central repository. This repository collates the data and serves it up for the monitoring tool's interface.
3. Monitoring Data Feeds 16—Measurement data is preferably pulled from the repositories every two minutes for all production servers and stored in the database administration warehouse for further processing.
4. Analytic Modeling 18—The data is then processes into summarizations, moving averages, and weightings. Ultimately, the processed data lead to a weighted score—the Health Risk Score (HRS) (see details below on how the HRS is determined according to the present invention).
5. Risk Scorecard Compilation 20—All the data for a specific server is assembled, organized and constructed into a report. Along with the report, a rules engine reviews the current HRS elements and assigned recommendations.
6. Risk Scorecard Analysis 22—A database administrator (DBA) reviews the report and recommendations providing a final recommendation at the end of the report. The DBA also provides feedback to improve the scoring model and report output.
7. Recommendation Consultation 24.
8. Recommendation Implementation 26—The application team works with database services to implement the recommendations that are appropriate and achievable.

Report Interpretation: A risk summary page holds the basic summary data for the targeted server's resource risk score. It provides a quick overview of the server's health and any recommendations that could improve the server's performance. The risk score components are broken down into several charts to outline how the risks are manifested.

A server detail chart lists out the basic details of the server that the SQL service is running on:
1) Host Name and Type (Cluster/AG/Stand-alone);
2) Manufacturer;
3) Install Date;
4) Machine Type (Physical or Virtual);
5) RAM amount in MB;
6) Core breakdown by sockets, cores and logical processors.

Figure 1:
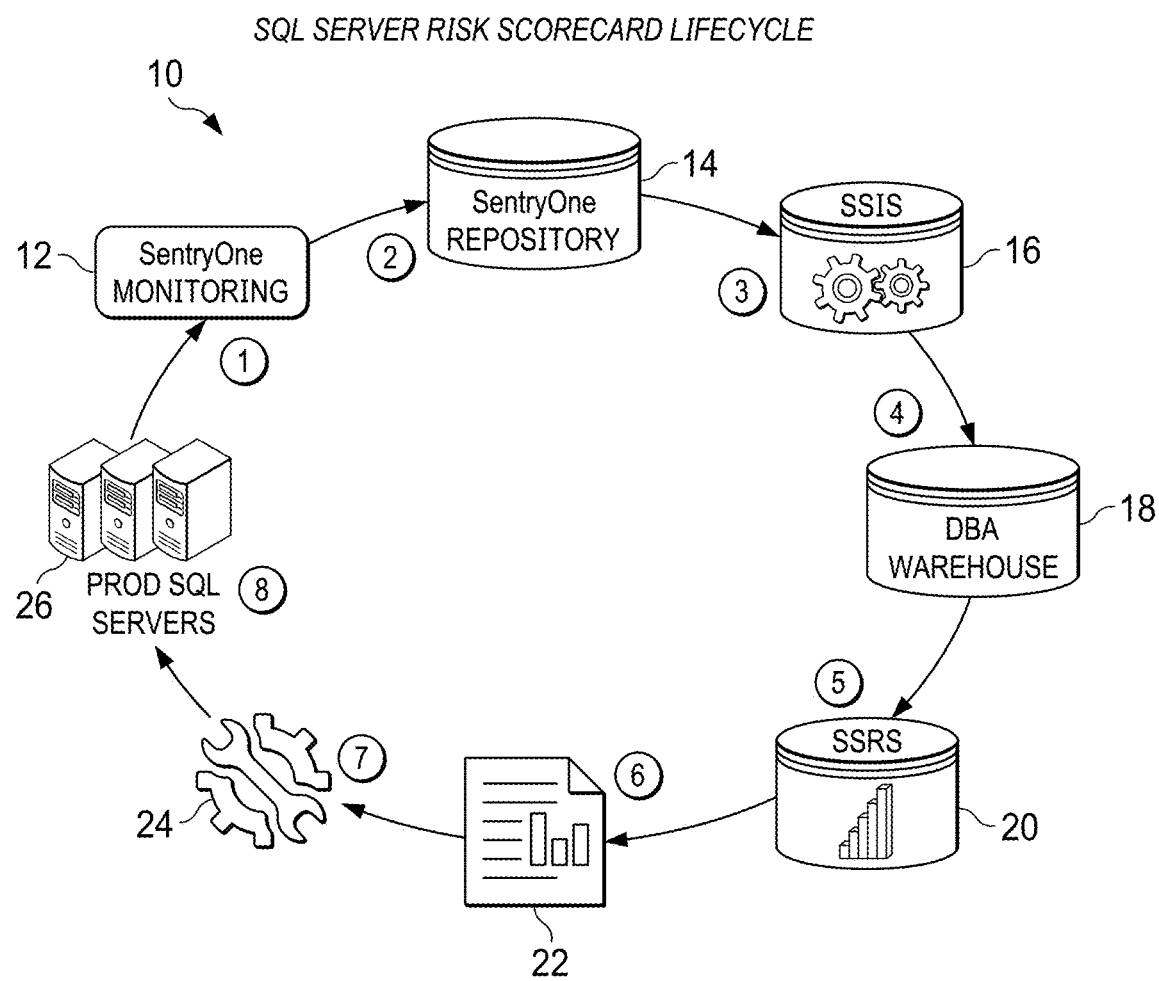
FIG. 1 illustrates the life cycle of one embodiment of the server health risk scorecard process.
Figure 2:
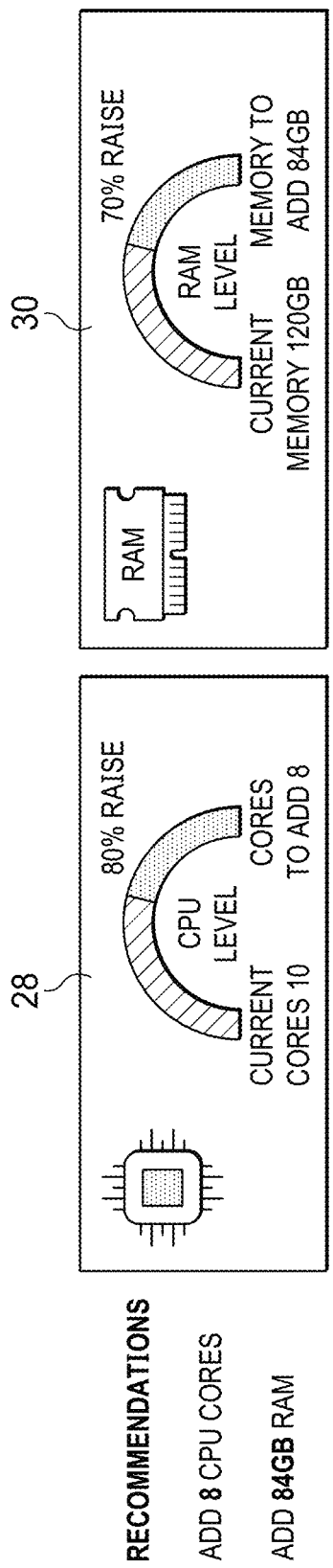
FIG. 2 illustrates one embodiment of a graphical view of a resource recommendation of the present invention.

Score components are broken down into several charts to outline how the risks are manifested. For example, a recommendations chart may be provided in FIG. 2. In this example embodiment, the automated recommendations are limited to the two major resource categories: computing (e.g., CPU) 28 and memory 30. The overall recommendations are listed on the far left with the recommended amounts of resources to add. (e.g., "Add 8 CPU Cores," and "Add 84 GB RAM"). Two graphic gauges representations illustrate the percentage of recommended change: in this example, "compute" is the number of CPU cores and is represented by the graph on the left while "memory" is the amount of RAM in GB in the graph on the right. For a detailed understanding of how the values are derived, see the description of the analytic processes section below. As illustrated, the chart displays, in graphical fashion, the number of CPU cores currently being used, the recommended number of CPU cores to add, the current memory being used, and the recommended amount of memory to add.

Figure 3:
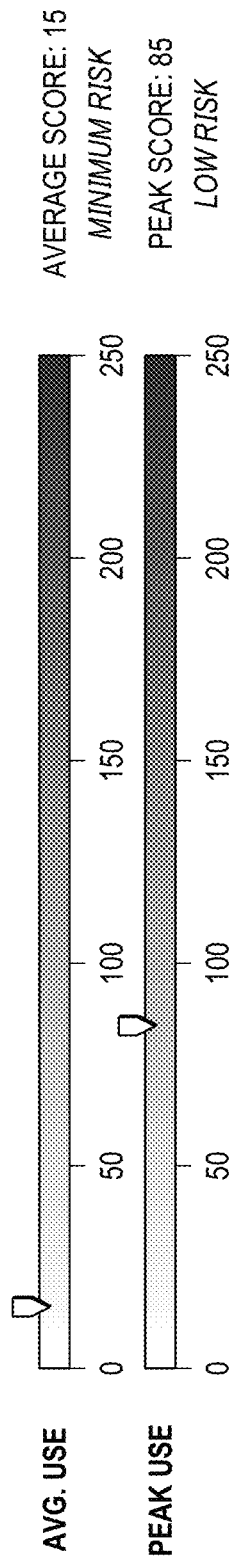
FIG. 3 illustrates one embodiment of a graphical view of a bar graph showing an "average use" health risk score and a "peak use" health risk score.

Risk Scores: In the preferred embodiment of the invention, a risk score is determined for each predetermined time period (e.g., one day) which is the sum of the weighted scores (e.g., the time above the threshold) for all targeted and predetermined resource measures (e.g., operating metrics). There are two types of risk score values that are then generated by the present invention (as illustrated in the graph of FIG. 3 and recommendations page shown in FIG. 24):
  i. Average Use or Score—this is the average score, summed by day, and averaged over the entire requested date range. For example, if the date range is 6 days (76, 89, 16, 200, 230, and 145), the average would be 108.
  ii. Peak Use or Score—this is the single highest score for any single day across the entire requested date range. For example, if the date range is 6 days and the scores are (76, 89, 16, 200, 230, and 145), the peak scored would be 230 because that is the highest score for the relevant period.

Figure 4:
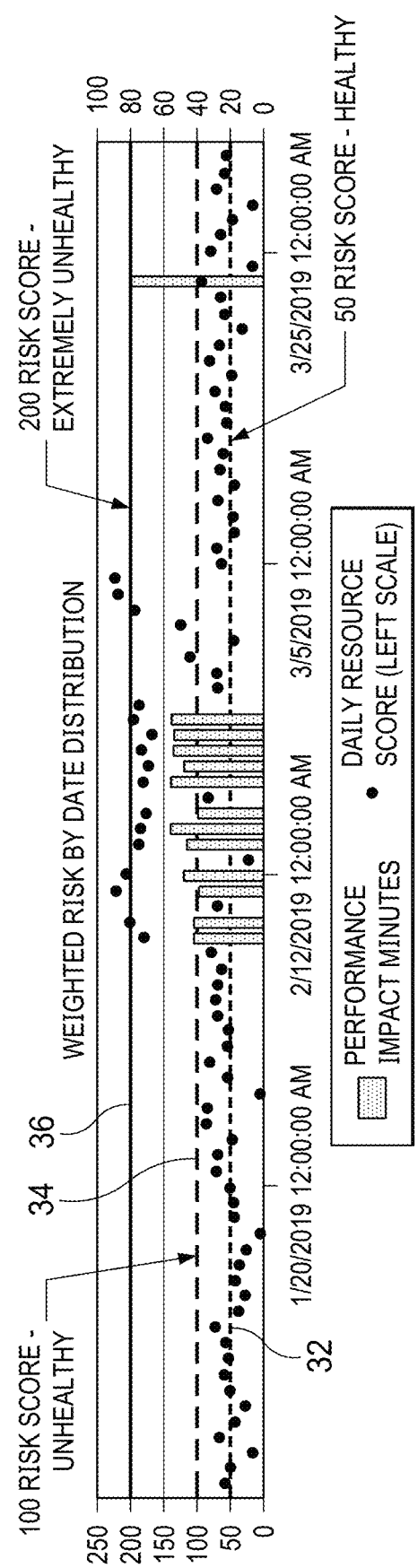
FIG. 4 illustrates a sample chart showing the weighted risk by date distribution for a server.

Weighted Risk by Date Distribution: FIG. 4 illustrates a sample chart showing the weighted risk by date distribution for a server. A daily risk score is calculated for each server in the population using the weighted algorithm of the present invention and stored for long term use and analysis. The measure is on the left vertical axis. When queried, the risk scores for the selected date range are graphed against the current risk stratification levels: For example, Healthy—50, Unhealthy—100, and Extremely Unhealthy—200 (these threshold levels shown generally at 32, 34, 36 respectively in FIG. 4).

Any risk score above 100 indicates that a server, for that day, was experiencing stress. When that risk score is above 200, the server probably experienced a degradation of service and probably required intervention.

Displaying the risk score in "day order" can expose processing patterns where the server experiences unique resource issues based on a specific timeframe or a pattern of repeating pressure that can be related to specific tasks (like ETL, end-of-month runs, etc.).

In addition to the risk score, extreme levels of resource usage are measured in performance impact minutes and is measured from the right axis. Performance Impact Minutes (PIM) are generated from the same data that calculates the risk score, but PIM are accumulated when the resource in question surpasses a higher limit (for example 90% CPU) while above a full standard deviation of the same server's quarterly average adjusted for day of week and hour of day. PIM measurements indicate "severe stress" on a server that might have a significant impact on operations.

Figure 5:
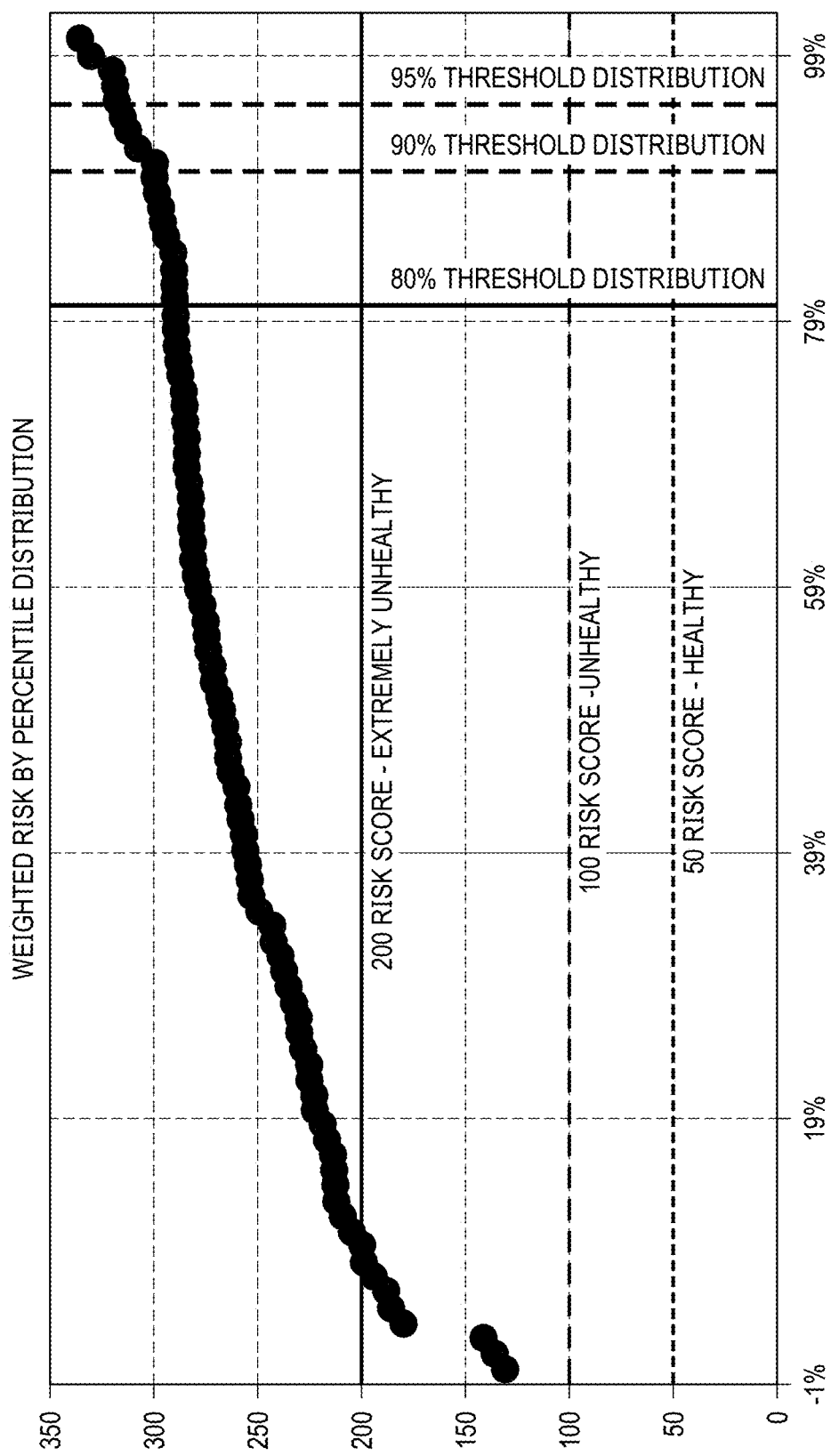
FIG. 5 illustrates one example chart showing weighted risk by percentile distribution.

Weighted Risk by Percentile Distribution: FIG. 5 illustrates one example chart showing weighted risk by percentile distribution. In this view the daily risk scores are ordered by value, from low to high, with vertical indicators to show 80, 90 and 95percentile of all scores. The targeted curve for all servers is: 80% of scores below healthy benchmark (50), 90% of scores below unhealthy benchmark (100), and 95% of scores below extremely unhealthy (200). In one embodiment, servers that are above this curve require remediation.

Figure 6:
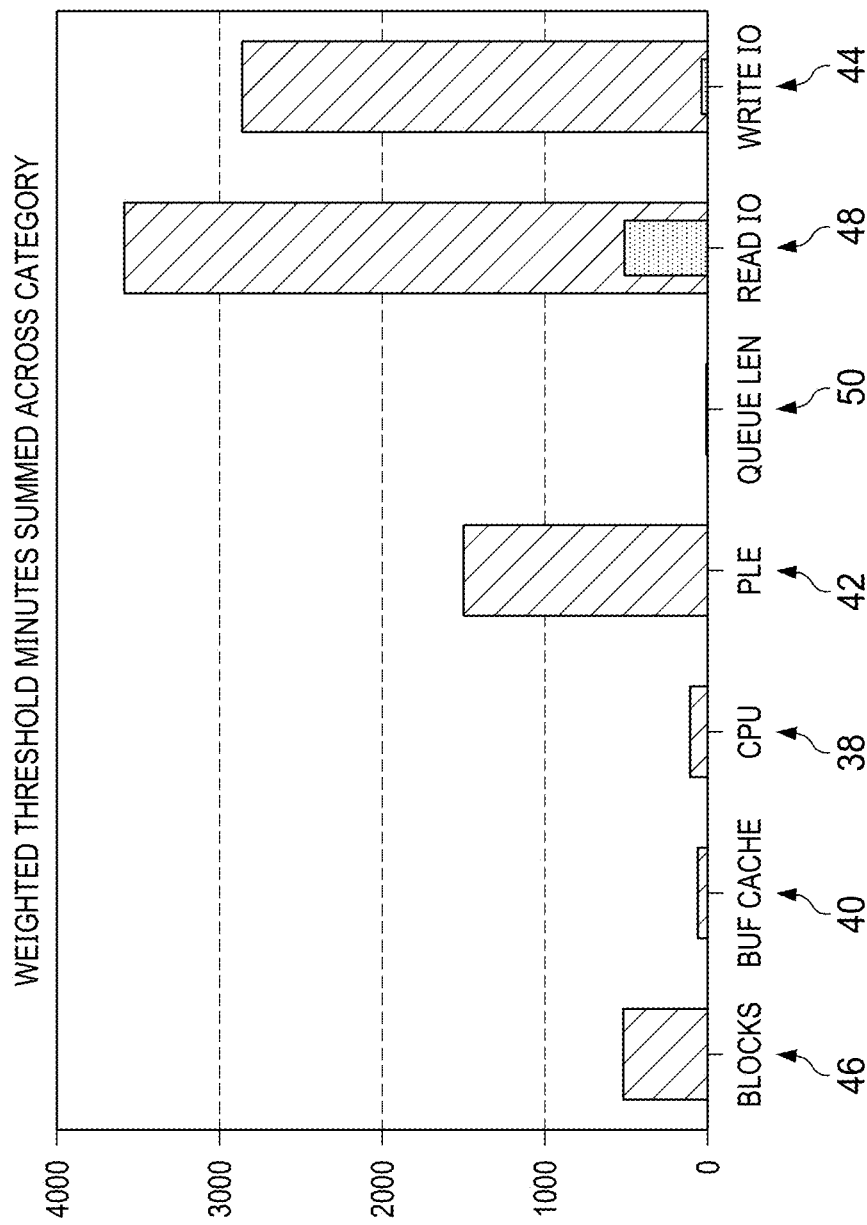
FIG. 6 illustrates one example chart showing weighted threshold minutes summed across categories.

Weighted Thresholds Summed Across Category: FIG. 6 illustrates one example chart showing weighted threshold minutes summed across categories. For example:

1. CPU processing 38;
2. Memory processing 40;
3. PLE-Average time that a data/index page stays in memory 42;
4. Write Disk IO Latency-Average latency in seconds that a write operation encounters 44;
5. Blocked Processed-Average number of processes (SPID's) causing blocking over unit time 46;
6. Read Disk IO Latency-Average latency in seconds that a read operation encounters 48;
7. Processor Queue Length-Average queue length (tasks awaiting processor) on machine instance 50.

This chart breaks down the sum of the daily risk scores for the requested date range into its constituent components as measured in their weighted summed minutes above the assigned threshold. This outlines how the average use risk score was constructed and indicates which resources are the major contributors. There is a bar within a bar (see generally at 48) that details the portion of the weighted score that was caused by Performance Impact Minutes (PIM). PIM measurements indicate severe stress on a server that might have a significant impact on operations.

Figure 7:
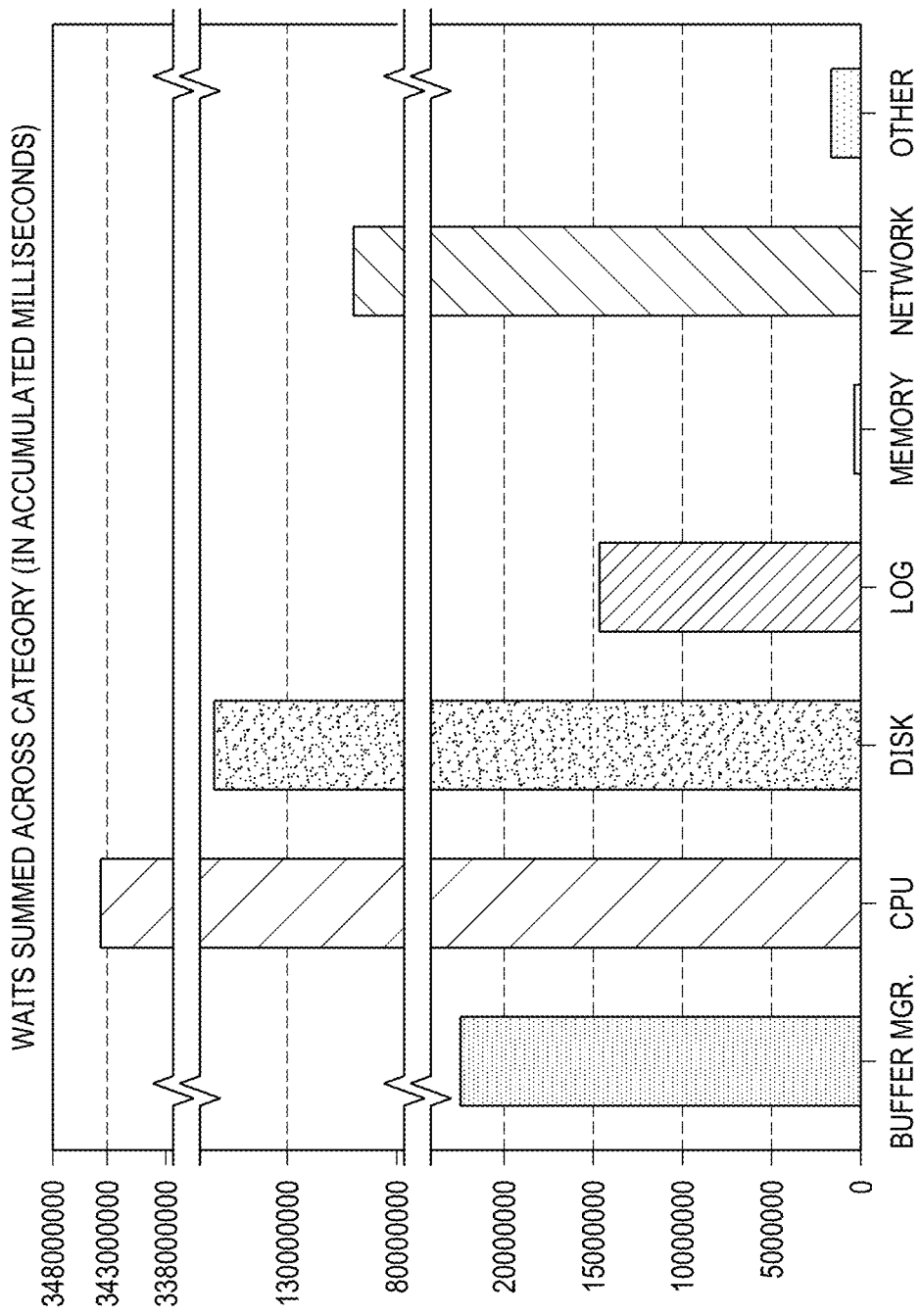
FIG. 7 illustrates one example bar chart that shows waits summed across categories.

Waits Summed Across Category: FIG. 7 illustrates one example bar chart that shows waits summed across category. This bar chart is a view of waits grouped by category which, in this example embodiment, breaks down the accumulated sums in milliseconds of SQL Waits. The categorization can assist in focused troubleshooting and optimization efforts in a limited area. The categorizations are broad groups that help guide investigators to the appropriate sub-systems and operations. These wait categories, and corresponding colors, align with the same categories in the real-time monitoring implementation.

| Category Name | Wait Focus | Color |
|---|---|---|
| CPU | Processing intense operations and signal waits. | Green |
| Buffer Manager | Waits for moving pages into and out of memory for processing. | Blue |
| Memory | Memory operations that impact operations (grants, semaphores, etc.). | Light Blue |
| Disk | Disk based waits generally around latency and disk operations. | Orange |
| Network | Network operations that are affected by latency and throughput. | Yellow |
| Code/Structure | Waits that correspond to structural or code related elements. | Grey |
| Log | Waits around the performance and efficiency of log operations. | Green |
| Parallelism | Waits based on synchronizing parallel operations. | Purple |
| Other | Critical waits outside of existing groupings. | Grey |

Figure 8:
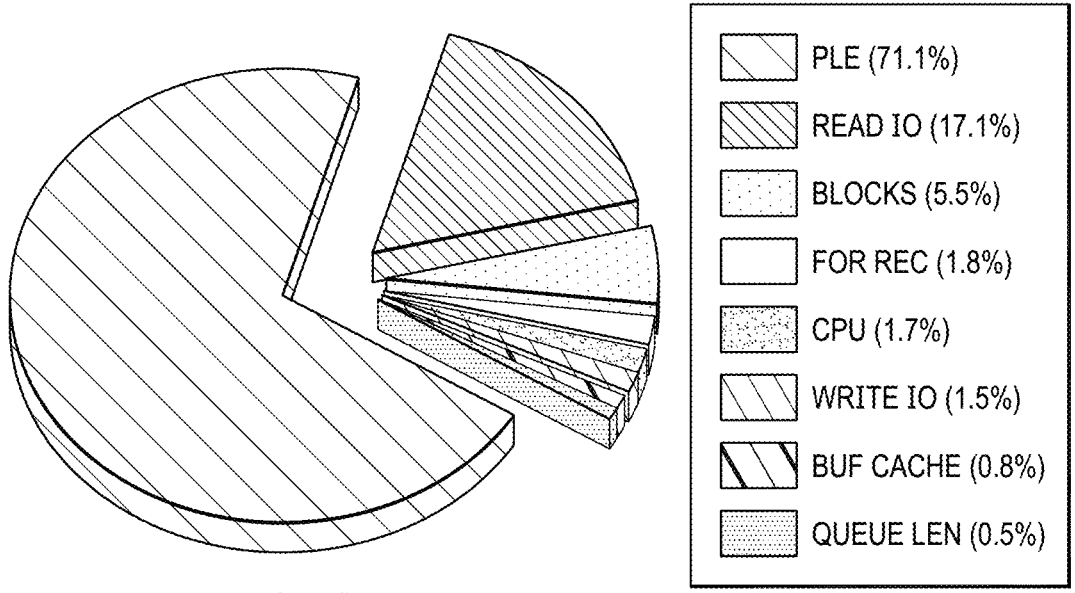
FIG. 8 illustrates one example chart showing the break-out details of the determined health risk scores.

Risk Scorecard Detail and Totals: FIG. 8 illustrates one example chart showing the details of the determined server HRS. The risk detail page breaks the risk score down into its basic components and outlines how the average use risk score was constructed and how those measures compare to the previous monitoring timeframe.

The risk score totals pie chart of FIG. 8 indicates how much of each resource measure contributed to the overall HRS for the selected timeframe. The percentage represents the portion of any one measure's weighted, accumulated minutes that contributed to the average risk score total. This allows a quick understanding of whether there is a set of measures that are impacting the score or if there is an overly dominant resource restriction.

Figure 9:
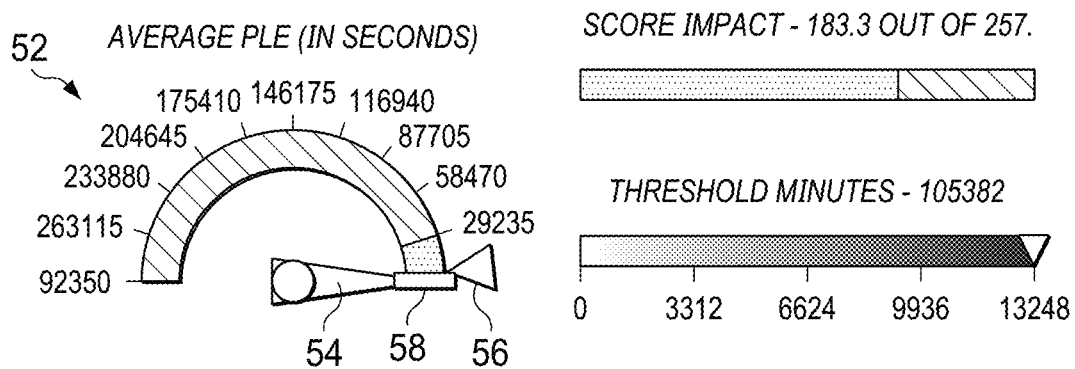
FIG. 9 illustrates an example chart showing a detailed listing for the PLE resource.

Detailed Listing for Each Resource Measure/Operating Metric: FIG. 9 illustrates an example chart showing a detailed listing for the PLE resource. Each resource measure that comprises the risk score is detailed in its own focus box and includes:

1. Actual Measure Value Gauge 52—This gauge is measured in the native units (as recorded by real-time monitoring), has a demarcation line (e.g., a green/red boundary) that indicates where the threshold value is, and covers three measures:
   a. Average measure for current period, e.g., indicated by a long red pointer 54;
   b. Average measure for trailing period, e.g., indicated by a short black pointer: 56;
   c. Average measure when measure is above the threshold, e.g., indicated by a yellow rectangle: 58.
2. Score Impact Indicator-shows the amount of the total score that was from this measure.
3. Threshold Minutes Indicator-displays the total number of threshold minutes for the measure for the select timeframe.

In the preferred embodiment, there is a focus box for each of the following resource measures:

1. Average CPU (Computing Power Utilized)—Average CPU % across all cores used on machine instance.
2. Available Memory—Amount of memory (MB) free for SQL Server not currently allocated.
3. Processor Queue Length—Average queue length (tasks awaiting processor) on machine instance.
4. Average PLE—Average time that a data/index page stays in memory.
5. Compile/Re-compile—Average number of compiles and recompiles per second occurring on SQL Server instance.
6. Write Disk IO Latency—Average latency in seconds that write operation encounters.
7. Blocked Processed—Average number of processes (SPID's) causing blocking over unit time.
8. Read Disk IO Latency—Average latency in seconds that read operation encounters.
9. Forwarded Records—Average number of forwarded records (extended page operation during write) over unit time.
10. Page File Usage—Average amount of the paging file used by the operating system.

Figure 10:
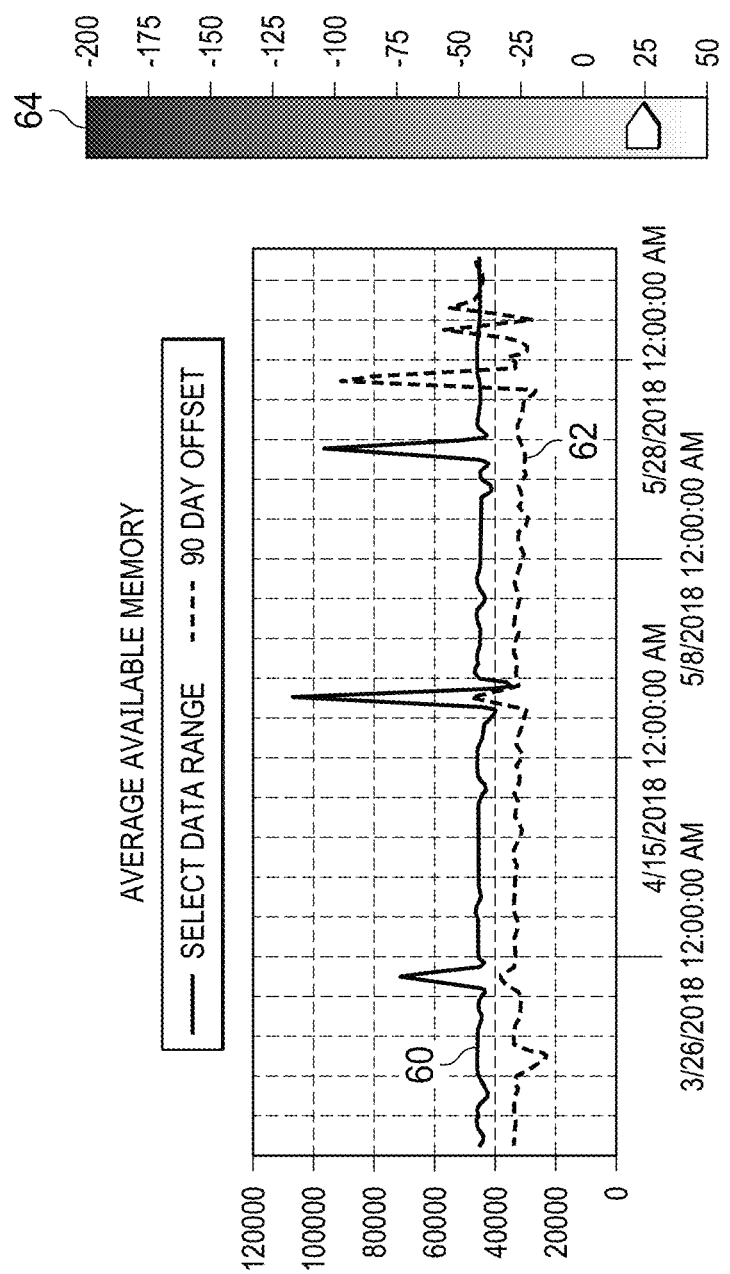
FIG. 10 illustrates one example detail pane for the average available memory.

Detail Panes: Each resource measure has its own detail pane that contains a time-based graph with the measure's values over the selected timeframe. FIG. 10 illustrates one example detail pane for the average available memory. This graph has a darker line 60 that is the actual measure values and a lighter dashed line 62 that is the values for the offset date range. This offset data is adjusted to day of week and matches time of day.

To the right of the time-based graph is an impact gauge 64 that indicates the relative averaged measure difference between the selected date range data and the offset data range. The indicator lower on the gauge signifies that the selected data range averaged value is better (less impactful on the server) than the offset data range averaged value, while the indicator being higher shows that the more recent data is worse (more impactful on the server).

Storage Detail: The storage detail page provides quick glances of the memory space that each database is currently using and a map of the drives available and their storage state. A database space usage matrix contains a listing of each database on the instance and details the data space actually used (not reserved) for the database and log files.

Disk Space Usage: FIG. 11 illustrates one example chart showing a list of drives including details of the drive capacity, the amount of drive space free and a gauge indicating the various alert levels and where the storage sits compared to those levels.

Figure 12:
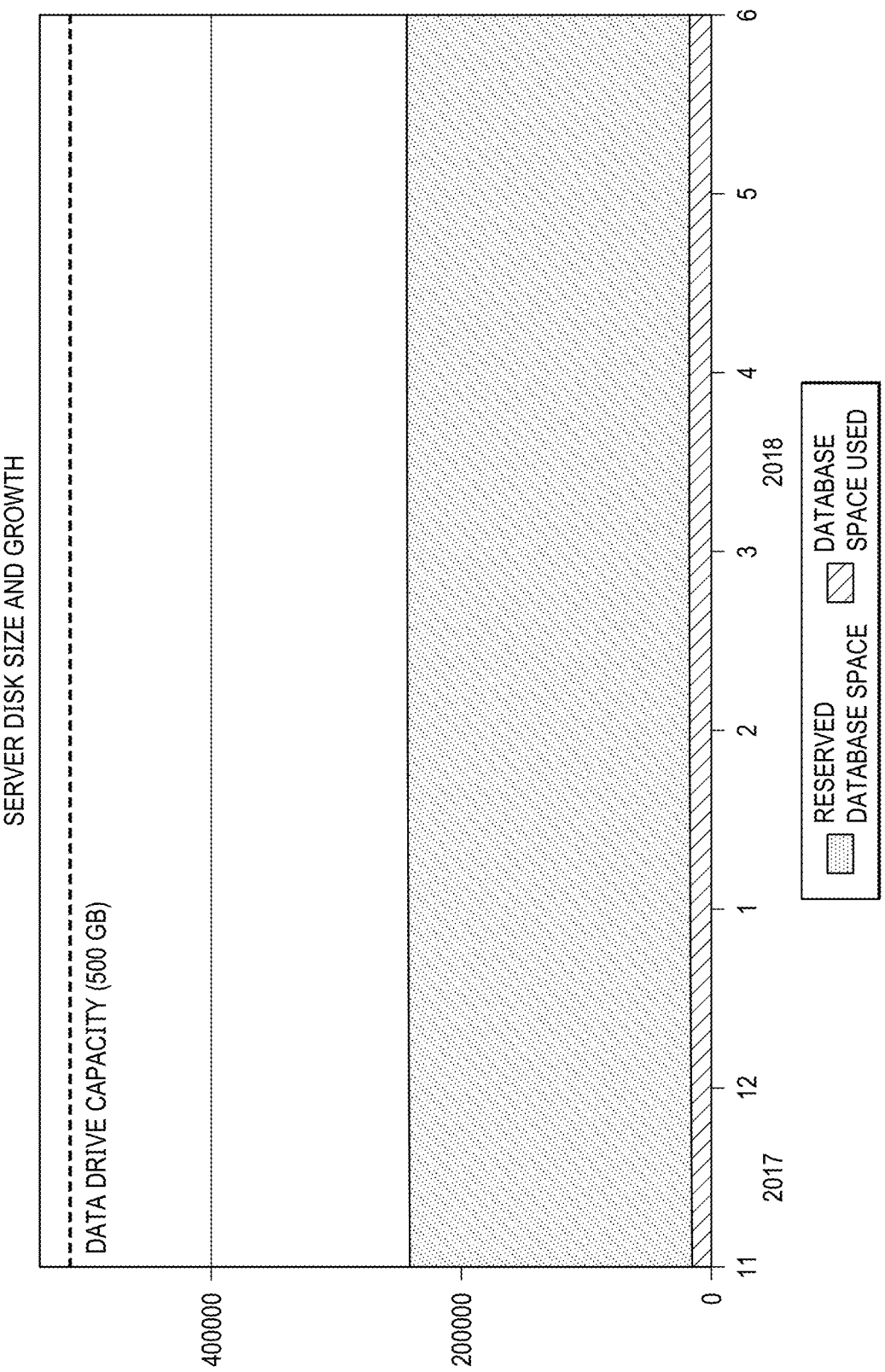
FIG. 12 illustrates one example chart showing a time-based graph outlining the data file summary across all databases.

Storage Trends: The Storage Trends page of the present invention uses rudimentary calculations and trending graphs to outline the trends in data growth and provides some rough measures for time left with current server storage. FIG. 12 illustrates one example chart showing a time-based graph outlining the data file summary across all databases by actually used and reserved space. The dotted line is the total drive capacity of the normally designated data drive letters (K, M, N, etc.). The graph measures the reserved database space versus the database space being used. This chart is useful to spot fluctuations in data use.

Figures 13, 14:
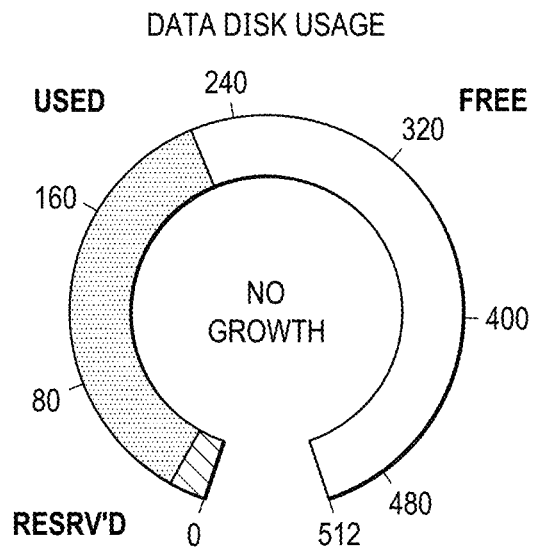
FIG. 13 illustrates one example embodiment of a data disk usage gauge of the present invention.
FIG. 14 illustrates one example of a growth rate matrix chart.

Data Disk Usage: FIG. 13 illustrates one example embodiment of a data disk usage gauge of the present invention. The data disk usage area outlines the growth rates and tries to estimate the time left on current storage from a very basic model. This gauge indicates the current state of the amount of data used in the data files, the amount of defined reserved space, and the total amount of free space left on the pre-identified data drives. The center of the gauge depicts an estimation of the number of days left until the drives are full based on the averaged growth rate. If the growth rate is negative, "No Growth" is the estimate.

FIG. 14 illustrates one example of a growth rate matrix chart. The growth rate matrix breaks down the growth rate of data usage by month and tries to estimate the number of days until intervention is required. This chart is useful to show where a large amount of data is added or removed and when.

Figure 15:
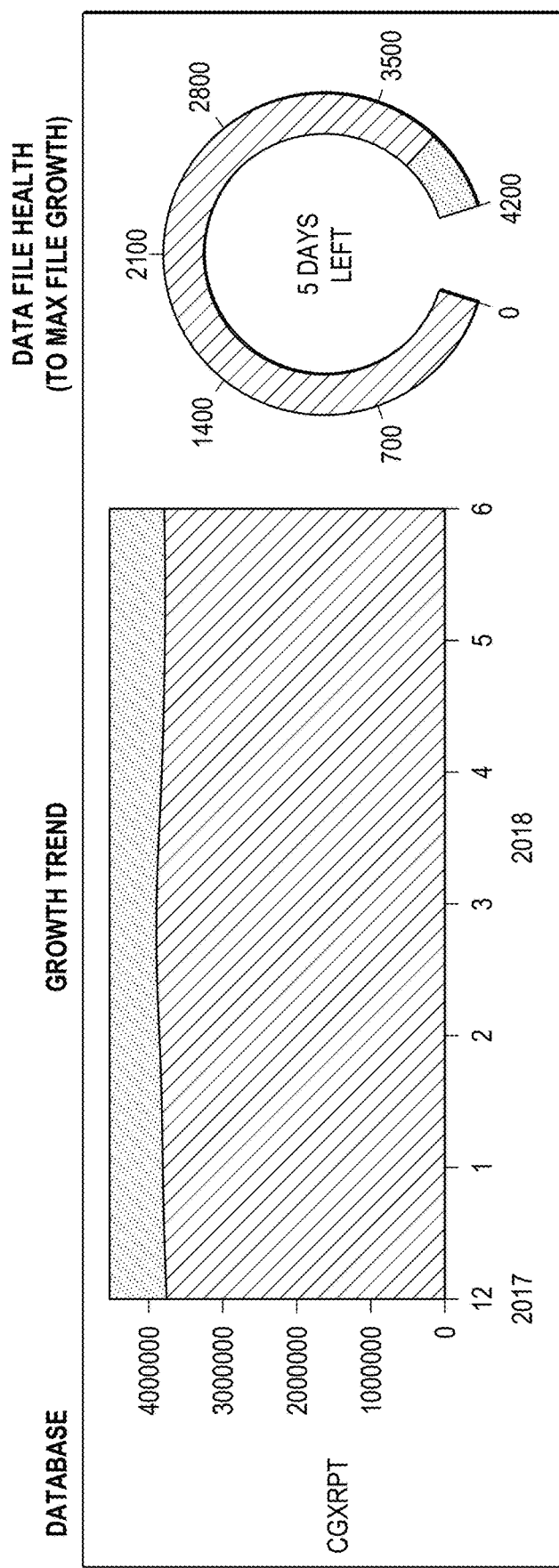
FIG. 15 illustrates one example embodiment of a chart showing an abbreviated view of time-based database size and growth, as well as data disk usage information.

Database Breakdown: FIG. 15 illustrates one example embodiment of a chart showing an abbreviated view of time-based database size and growth, as well as data disk usage information, for each database. Included in the data disk usage is an estimate outlining how many days are left on the current data files. Instead of depicting an estimate based on total disk space available it estimates time until MAX GROWTH is encountered. If the growth rate is negative, "No Growth" is the estimate.

Again, the Health Risk Score (HRS) of the present invention is preferably a weighted, time-based score that represents the amount of time per day that a server is above specific metric thresholds that have a strong correlation to performance impact and platform stress. These metrics are preferably accumulated at the 2-minute granularity and have two thresholds:
1. Score Threshold—Value above which the number of minutes is accumulated for that metric for each day that is used to calculate the Health Risk Score.
2. Performance Impact Minute (PIM) Threshold—Value above which the number of minutes is accumulated for that metric for each day indicating extreme stress on that metric.

Although this method is being used with SQL Server specific metrics, the method could easily apply to other platforms using the metrics that represent a pressure diagnostic indicator.

Figure 16:
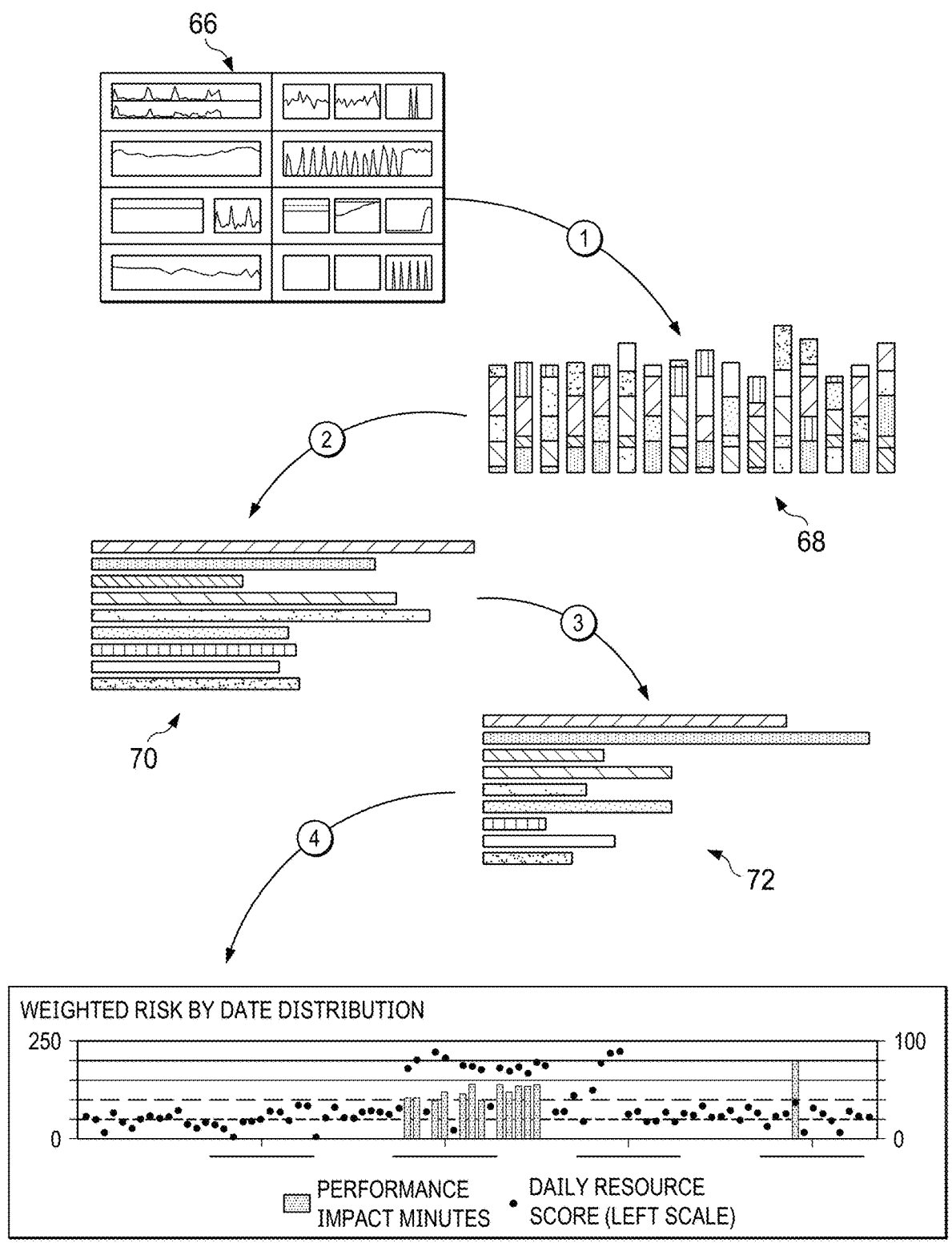
FIG. 16 illustrates a graphical depiction of one embodiment of the process of determining server health risk scores of the present invention.

The overall process for determining the HRS according to one embodiment of the present invention is broken down into 4 steps (as illustrated in FIG. 16):
1) data is gathered from a source monitoring system and stored as an atomic measure in a minute level time series and tied to the server and specific metric type 66.
2) each atomic measure in the time series is compared against the threshold for that metric. When the atomic measure exceeds the metric threshold the associated time (i.e., spent above the threshold) is summed at the metric level 68.
3) the summed metric time value above the metric threshold value is weighted against the threshold matrix to produce the weighted metric value of that metric for that day for that server 70.
4) all weighted metric values are then summed to produce the health risk score for each individual server 72.

Threshold Matrix: In the preferred embodiment, the overall HRS is based on a set of weighted metrics focused on SQL Server performance. The values of each metric threshold value were first derived by prioritization of a metrics impact on performance, then refining the results by comparing each metric's initial weighting with the historic values for servers that are under pressure. The data was collated, modeled, and reviewed to produce the following final threshold matrix as shown in FIG. 17.

In one embodiment of the invention, each of the operating metrics in the table of FIG. 17 are used as the constituent components that make up the health risk score. More particularly, the general rules for generating a health risk score are:
1. The measure window for each operating metric is a 24-hour period between midnight to midnight the next day.
2. Measures of each operating metric below or above the threshold (depending on the operating metric) for their category are ignored because they have not been triggered. For example: A CPU at 59% is ignored because it is below the "Above" operator. Memory at 5000 MB is ignored because it is above the "Below" operator.
3. Measures of each operating metric above or below the threshold (depending on the operator) for their category are triggered and start being measured. For example: A CPU at 61% is measured because it is above the 'Above' operator. Memory at 900 MB is measured because it is below the 'Below' operator.
4. Each measurement is a measure of time above or below the threshold. For example: each triggered measure is the equivalent of two minutes.
5. For each operating metric: sum together the amount of time (e.g., in minutes) accumulated in the 24-hour window when each operating metric goes past its predetermined threshold (e.g., goes above or below its threshold, depending on the metric). For example, if CPU has a total time of 208 minutes about the threshold (60%), that is the measure for that day.
6. Each operating metric (e.g., CPU, PLE, etc.), its accumulated minutes is multiplied by its corresponding weighting. For example, if CPU was above the threshold (60%) for 208 minutes, then it is multiplied by the weighting (21.5%), which would be 44.72 score for CPU.

7. Each operating metric is then added together for a final daily HRS.
8. Operating metric details (see table of FIG. 17):
    a) Processor Computing Power Utilized\ % Processor Time—Time accumulated when measure is above 60%.
    b) Memory\Available Mbytes—Time accumulated when measure is below 1000 MB.
    c) SQLServer:Buffer Manager\Page life expectancy—Time accumulated when measure is below the calculated amount (X). This operating metric is the average amount of time, in seconds, that a data page remains in memory. When it goes below the threshold, which is calculated amount (X) based on memory, the system starts counting the time below the threshold.
        i. To calculate the lower bound threshold in seconds: ([RAM on Server]*0.9)−4096)/16.
        ii. A page that spends more time in memory is more efficient.
    d) PhysicalDisk\Avg. Disk sec/Write—Time accumulated when measure is above 50 milliseconds. This operating metric represents the amount of latency, in milliseconds, between a write request and a write confirmation.
    e) SQLServer:General Statistics\Processes blocked—Time accumulated when measure is above 1. This operating metric represents when one query request is being blocked by another that is performing an operation (e.g., query A waiting for query B to finish writing the same data to disk).
    f) PhysicalDisk\Avg. Disk sec/Read—Time accumulated when measure is above 50 milliseconds.
    g) Processor Queue Length\System—Time accumulated when measure is above 2. This operating metric represents the number of threads that are in a wait state because the processors are busy.
    h) SQLServer:Buffer Manager\Buffer cache hit ratio—Time accumulated when measure is below 90%.
    i) Paging File\% Usage—Time accumulated when measure is above 40%.
    j) SQLServer:SQL Statistics\SQL Compiles & Recompiles/sec—Time accumulated when measure is above 1000. This operating metric represents the number of queries that were recompiled because something in the query plan has changed, or the cache that had the compiled code was flushed.
    k) SQLServer:Access Methods\Forwarded Records/sec—Time accumulated when measure is above 1000. This operating metric represents the number of records per second fetched through forwarded record pointers.

For all of these operating metrics, there are preferably two different measures:
1. Threshold Measure—a measure above (or below depending on the direction) which time is starting to be counted.
    a. If the predetermined threshold level is passed, the system starts accumulating the time the operating metric remains past the threshold level associated with each operating metric;
    b. If the threshold level is no longer passed, the system stops accumulating time.
2. Measured Time (time duration that the threshold level was passed)—Accumulated time for a 24-hour period between midnight and midnight.
    a. Each measure will have a different accumulation of time, preferably in minutes.
    b. Examples:
        i. CPU was above 60% for 30 minutes in the morning, and then another 18 minutes later at night. The total accumulated time for the CPU measure would be 48 minutes.
        ii. PLE (SQLServer:Buffer Manager\Page life expectancy) dropped below 1000 seconds three times in a single day. First for 45 minutes, again later for 67 minutes, and one last time at night for 14 minutes. The total accumulated time for the PLE measure would be 126 minutes.
        iii. Processor Queue Length\System raised above 1 and fell back to 0 multiple times a day. It raised to 2 for 35 minutes then back to 0, later raised to 2 for 17 minutes then back to 0. The total accumulated time for the Queue Length measure would be 52 minutes.

In summary, the present invention is configured to watch key operating measures (e.g., CPU, PLE, etc.) and once the predetermined thresholds levels are violated, the system starts accumulating time for each individual measure. There are multiple operating metrics that create the integrated model that represents the Health Risk Score. Once the operating measures' time are accumulated, they are then weighted and combine into an overall score.

In the preferred embodiment, the matrix contains:
1. Threshold Name—The specific SQL Server metric as measured by the real-time monitoring of the present invention.
2. Score Threshold—The value above or below, depending on the operator metric, that triggers accumulation of minutes from which a score value is calculated.
3. Performance Impact Minutes (PIM) Threshold—The value above or below, depending on the operator metric, that triggers accumulation of PIM's.
4. Operator—Value that determines the direction of threshold violation.
5. Weighting—The value that is used to weight the specific metric's percentage in the final Health Risk Score value.

The actual Health Risk Score calculation in the preferred embodiment is:

$$M_{n,th} = \begin{cases} 2, & \text{if } n > th \\ 0, & \text{otherwise} \end{cases} \rightarrow \text{Time Measure } (M) -$$

Determine whether an element within the daily time series exceeds the threshold and should be counted toward the Health Risk Score.

$A_{n,th} = \Sigma M_{n,th} \rightarrow$ Accumulated Time (A)—Accumulate each time series that exceeds the threshold value per threshold type.

$WMS_{n,th} = A_{n,th} * W_{th} \rightarrow$ Weighted Metric Score (WMS)—Multiply each threshold accumulation by the associated threshold weighting percentage.

$HRS_{n,th} = \Sigma WMS_{n,th} \rightarrow$ Health Risk Score (HRS)—Sum all accumulated Weighted Metric Values into the final daily score.

Automated resource recommendations use the WMS for resource related resource recommendations by determining the average and peak score WMS values for a given date range. The algorithm recommendations are based on the following calculation:

$$RS_{a,p} = \begin{cases} a, & \text{if } a > TVa \\ p, & \text{if } p > TVp \\ 0, & \text{otherwise} \end{cases}$$

Resource Score (RS)—Determined by looking at average and peak WMS and seeing which one, if any, violate the trigger value to make a resource increase.

$$IT_{a,p} = \begin{cases} .2, & \text{if } a > TVa \\ .1, & \text{if } p > TVp \\ 0, & \text{otherwise} \end{cases}$$

Intensity Type (IT)—Determined how much of an increase will be applied based on which aggregate value (average vs. peak) trigger value is violated.

RIF=$(RS_{A,p}/200.0)*IT_{a,p}$→Resource Increase Factor (RIF)—Multiply the determined resource score (RS) with the intensity type (IT) to get the resource increase factor.

RI=$RU_c*RIF$→Resource Increase (RI)—Determine how much resource to recommend by multiplying resource increase factor with the resource units from the measured period.

Figure 18:
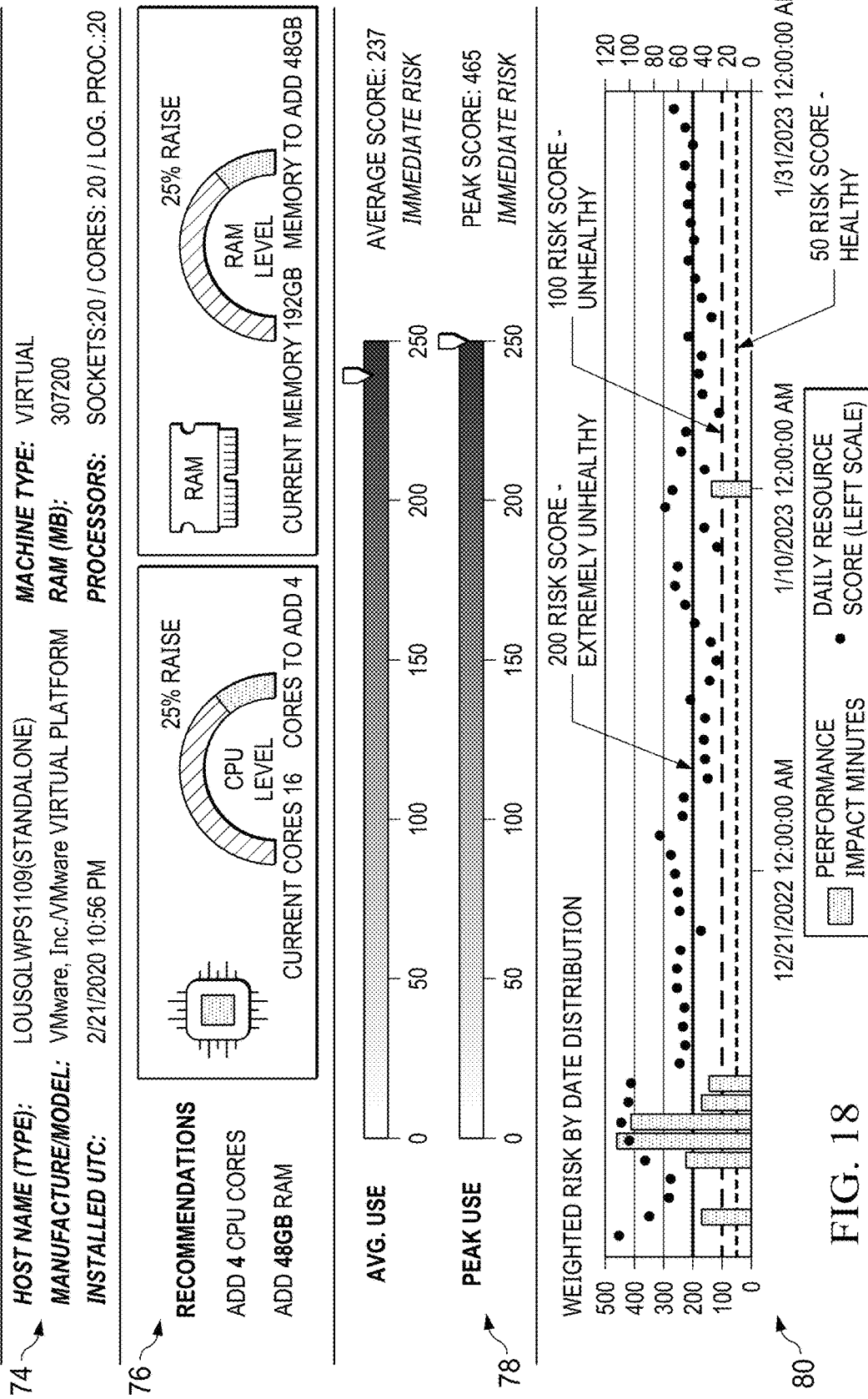
FIG. 18 illustrates one example of a graphical based server health risk scorecard.

The present invention has the ability to configure and generate various reports. FIG. 18 illustrates one example graphical based server health scorecard 74 for an example server (LOUSQLWPS1109). As discussed, the HRS of the present invention is, in the preferred embodiment, a weighted, time-based, score that represents the amount of time per day that a server is above specific metric thresholds that have strong correlation to performance impact and platform stress. This provides an overall HRS for a server, and breaks down the score into the various elements and includes:

i. Automated Resource Recommendations
  ii. HRS History Date Distribution
  iii. Population Comparison
  iv. Score Distribution
  V. Threshold Violation Summary
  vi. SQL Waits Summary
  vii. HRS Breakdown
  viii. HRS Component breakdown & Component Graphical History
  ix. SQL Wait Summary and Breakdown In this embodiment of the graphical scorecard as shown in FIG. 18, the graphical scorecard is comprised of various charts, diagrams or charts as previously shown in FIGS. 2, 3 and 4 (shown generally at 76, 78, 80).

Figure 19:
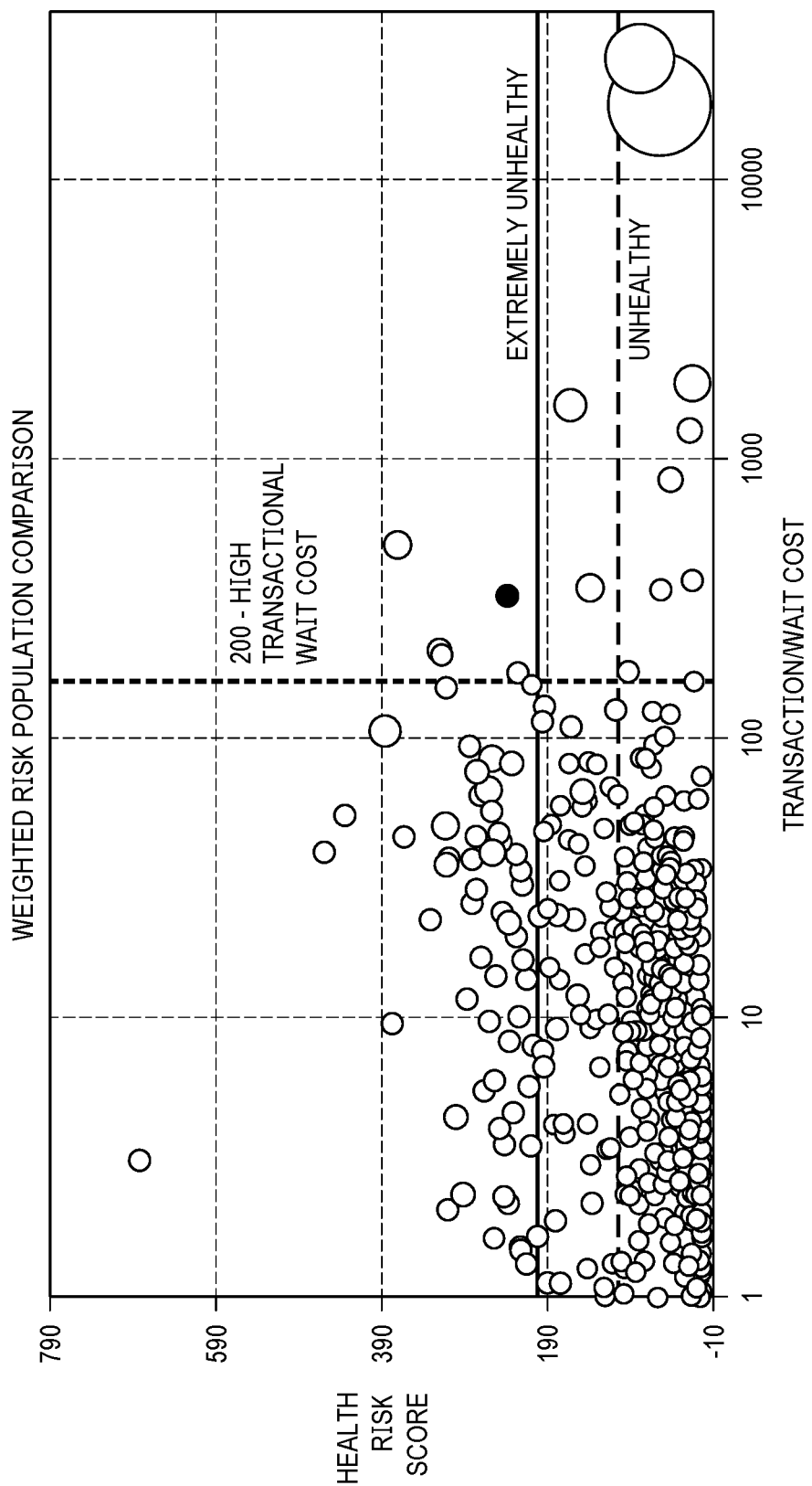
FIG. 19 illustrates one embodiment of a graph showing the weighted risk population comparison of the monitored server.
Figure 20:
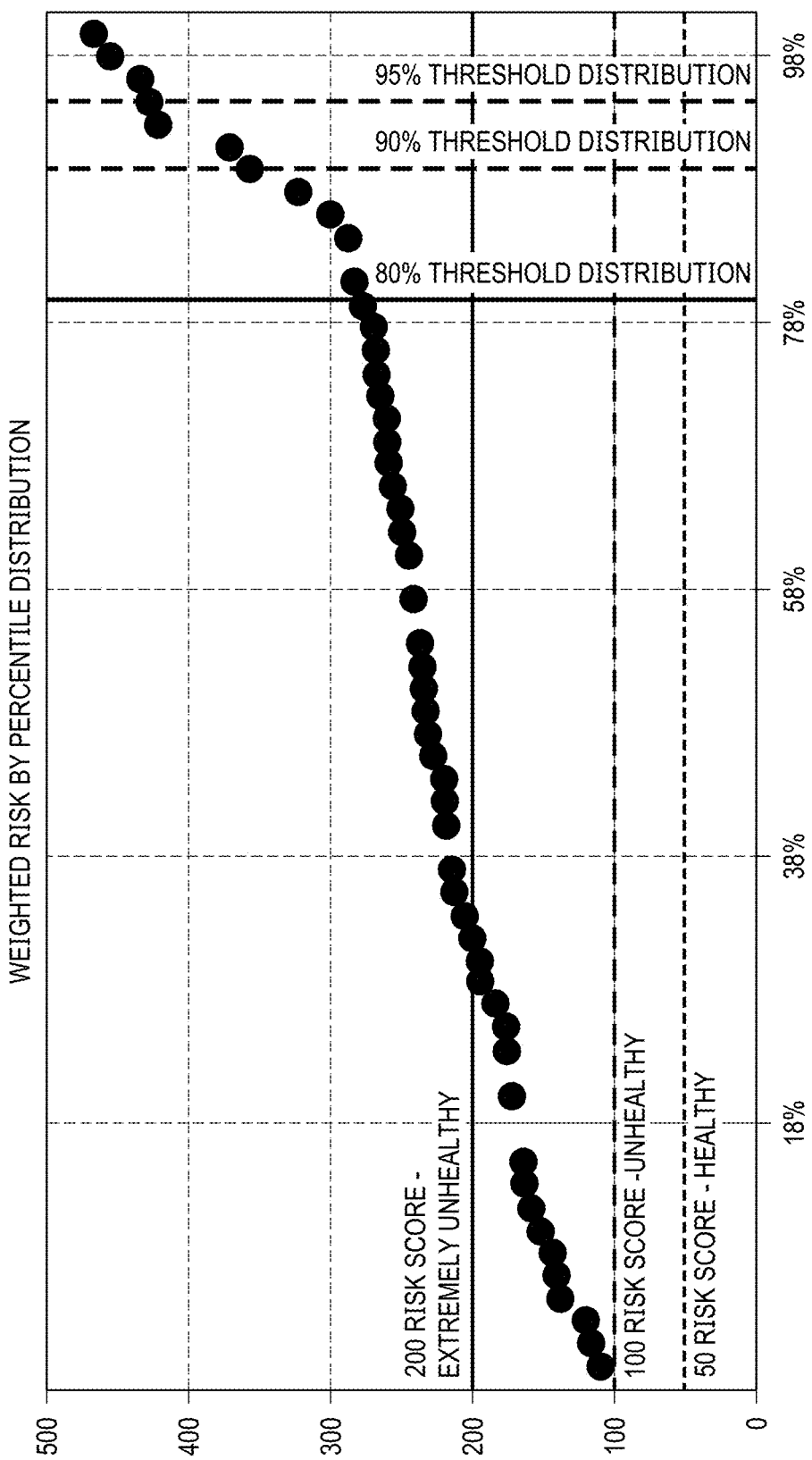
FIG. 20 illustrates one embodiment of a graph showing the weighted risk by percentile distribution.
Figure 21:
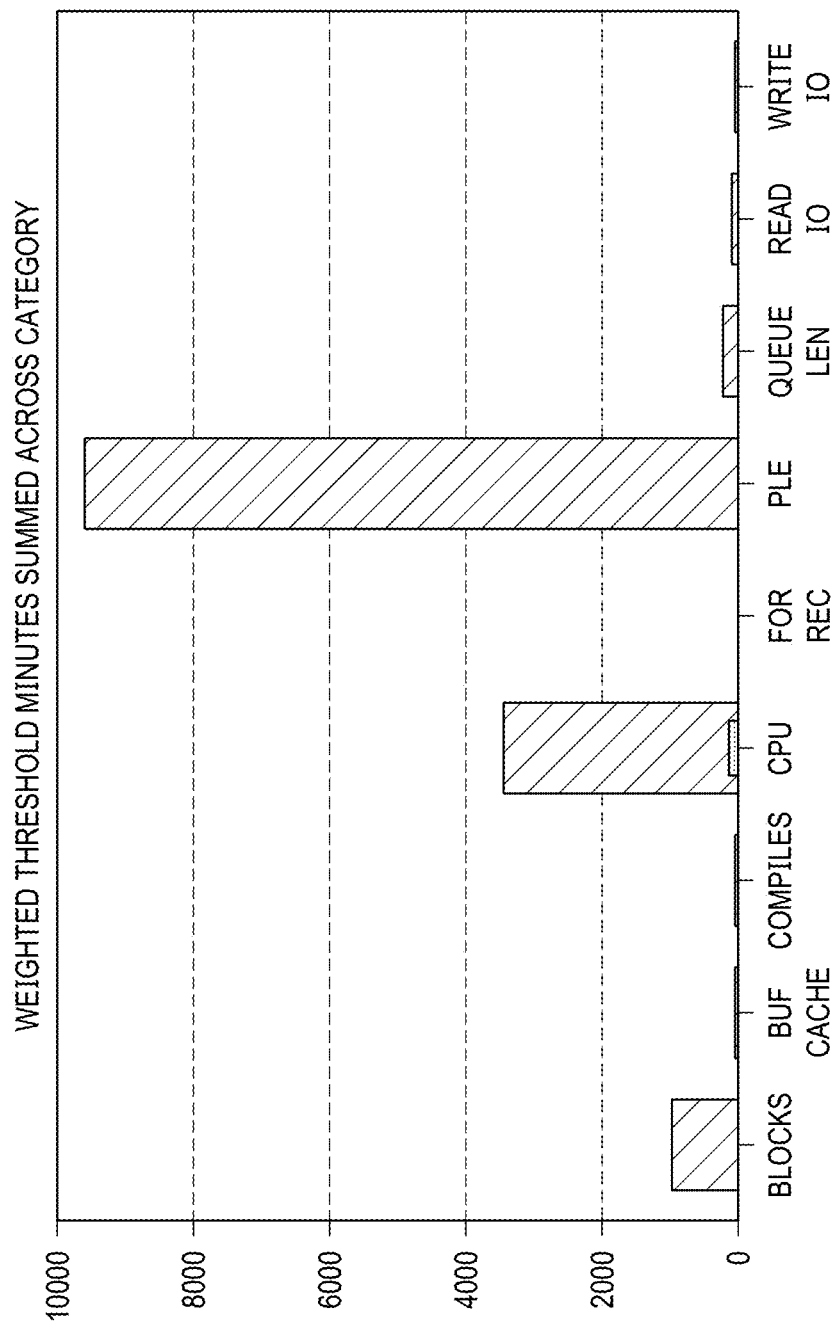
FIG. 21 illustrates one embodiment of a graph showing weighted threshold minutes summed across health categories.
Figure 23:
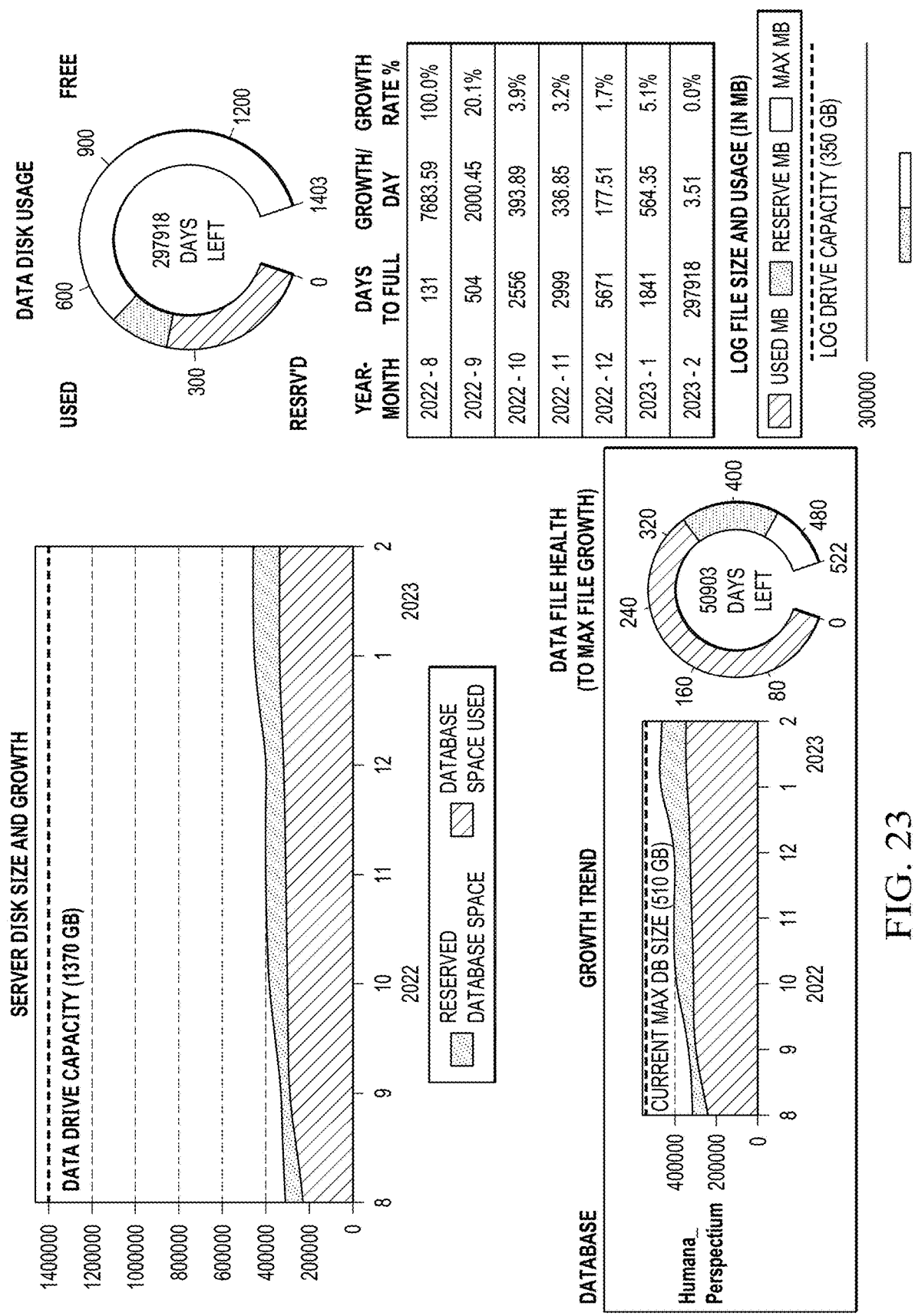
FIG. 23 illustrates one embodiment of a graph showing server disk sizes and growth trends for the monitored servers.

The present invention is also configured to present server health data in other graphical forms. For example, FIG. 19 illustrates one embodiment of a graph showing the weighted risk population comparison of the monitored servers. As shown, the lines in the graph show the thresholds for unhealthy and extremely unhealthy servers. FIG. 20 illustrates one embodiment of a graph showing the weighted risk by percentile distribution. FIG. 21 illustrates one embodiment of a graph showing weighted threshold minutes summed across health categories. FIG. 22 illustrates one embodiment of a graph showing storage detail of the monitored servers. For example, in this graph, the details of a particular database is displayed including data space, log space, server name, capacity (MB) free space (MB) and disk health status. FIG. 23 illustrates one embodiment of a graph showing server disk sizes and growth trends for the monitored servers.

Segment Detailed Server Analysis: segment detailed server analysis of the present invention leverages additional performance data from the real-time monitoring from the present invention to provide detailed recommendations so the owners and support personnel of a server and associated databases can take action to improve performance and reduce the possibility of operational impacts. FIG. 24 illustrates one embodiment of a graph showing an action or recommendations plan generated by the present invention based on the server monitoring and calculation of the weighted risk scores. The primary focus of the analysis report is:

i. Health Risk Score (HRS)—average score and peak score.
  ii. Automated Resource Recommendations (including recommending hardware upgrades and adding CPU and/or RAM memory resources)
  iii. Missing Indexes-Listing of the most impactful missing indexes based on historically query plans.
  iv. Expensive Queries-A list of expensive queries based on a total wait of worker (resource) expenditure.

Population Health Risk Score Impact & Recommendations: the present invention is configured to take the historic HRS values and provide a list of servers that are unhealthy and extremely unhealthy and list them in the order of descending (or ascending in another embodiment) health scores. FIG. 25 illustrates one embodiment of a table showing the ordering of servers by health risk score 82 (average) and 84 (peak), current resources (CPU and RAM) 86, with recommendations on adding resources 88. The rows of the table (showing data for each monitored server respectively), can be color-coded based on health condition (e.g., red for extremely unhealthy, orange for unhealthy, yellow for moderately healthy, green for healthy).

The two key elements of the output of the present invention are:

1. Health Risk Score (HRS)—A threshold-based, weighted algorithm that measures the relative server stress a SQL Server infrastructure is under and indicates how a server's performance will be negatively impacted.
2. Resource Recommendation—An algorithm that takes the HRS value (weighted score) for a server and determines how much of a particular resource type (CPU, RAM) is needed to bring down the HRS in a meaningful way.

The HRS and the associated reports, provide the following advantages:

a. The recommendations are generated and provided to staff to make sure they get the resources they need to handle the business operations.
  b. The reports explain where their load is and why so they can make adjustments prior to going into periods of elevated demand.

Quarterly engagements should be conducted with teams that have the worst (top 30 servers/clusters) scores so that help can be provided to support their respective business. Actionable information is generated and provided (add indexes, refactor code in a specific way, etc.) to give the team a direction to go in making their system more efficient and cost effective (less resources). Comparisons are conducted over time to show the teams how their actions impact their performance over time.

While certain embodiments of the present invention are described in detail above, the scope of the invention is not to be considered limited by such disclosure, and modifications are possible without departing from the spirit of the invention as evidenced by the following claims:

What is claimed is:

1. A method for monitoring the health of a server or its infrastructure and for generating a server health risk score with recommendations regarding server resources, the method comprising the steps of:
   collecting a plurality of operating metrics of the server;
   associating a predetermined threshold level for each of the plurality of operating metrics;
   monitoring each of the plurality of operating metrics of the server to determine if any of the plurality of operating metrics of the server go past the predetermined threshold level associated with each of the plurality of operating metrics;
   tracking the duration of time that each of the plurality of operating metrics goes past the predetermined threshold level associated with each of the plurality of operating metrics over a predetermined time period;
   applying a weight to the tracked duration of time for each of the plurality of operating metrics to obtain a server health risk score for the server;
   determining how much of a particular resource is needed to bring down the server health risk score for the server;
   providing a report comprising the server health risk score and a recommendation to add a quantity of the particular resource to bring down the server health risk score for the server;
   generating a graphical report, comprising an indication of the server health risk score for the server, a graphical depiction of an amount of CPU cores currently being used by the server and a recommended amount of CPUs to add to the server, a graphical depiction of an amount of RAM currently being used by the server and a recommended amount of RAM to add to the server;
   generating performance impact minutes for at least one of the plurality of operating metrics of the server, wherein performance impact minutes are accumulated when the resource in question surpasses a higher limit or threshold while above a full standard deviation of the server's quarterly average adjusted for a day of week and hour of day; and
   including the performance impact minutes in the report.

2. The method of claim 1, wherein the predetermined time period is a day.

3. The method of claim 1, wherein the plurality of operating metrics includes an amount of CPU processing power being used, an amount of time that a data page remains in memory, an amount of latency, in milliseconds, between a write request and a write confirmation.

4. The method of claim 3, wherein the plurality of operating metrics further includes a buffer cache hit ratio, an amount of memory available, a number of processes being blocked by an on-going operation, and a number of threads that are in a wait state.

5. The method of claim 1, wherein going past the predetermined threshold level associated with each of the plurality of operating metrics means to go above or below the predetermined threshold level depending on the operating metric.

6. The method of claim 1, wherein the server health risk score is an average score over a predetermined time range.

7. The method of claim 6, further comprising the steps of:
   determining a peak health risk score for the predetermined time range; and
   including the peak health risk score in the report.

8. The method of claim 1, further comprising the steps of: generating a graph illustrating a weighted risk by date distribution; and including it in the graphical report.

9. The method of claim 1, wherein the quantity of the particular resource includes a number of central processing units (CPUs) and the amount of random-access memory (RAM).

10. The method of claim 1, wherein the performance impact minutes represents the amount of time the server is in a state of heightened stress.

11. The method of claim 1, further comprising the steps of:
   generating a list of all monitored servers ranked by server health risk score; and
   color coding the list of all monitored servers based on the health of each monitored server.

* * * * *